United States Patent [19]

Katsuta et al.

[11] Patent Number: 5,896,290
[45] Date of Patent: Apr. 20, 1999

[54] MAN-MACHINE INTERFACE SYSTEM FOR A PROCESS CONTROLLER

[75] Inventors: Hiroshi Katsuta; Yutaka Yamaguchi; Masamitsu Suzuki; Kiyoshi Sasaki; Shoji Hayashi, all of Shizuoka-ken, Japan

[73] Assignee: Toshiba Kikai Kabushiki Kaisha, Tokyo, Japan

[21] Appl. No.: 08/620,811

[22] Filed: Mar. 29, 1996

[30] Foreign Application Priority Data

Mar. 31, 1995 [JP] Japan ............................ P07-075539

[51] Int. Cl.⁶ ........................................... G05B 19/00
[52] U.S. Cl. .................. 364/188; 345/333; 345/353; 345/354
[58] Field of Search ................. 364/188, 475.05, 364/475.09; 345/133, 333, 353, 354, 356, 357; 395/333, 353, 354, 356, 357

[56] References Cited

U.S. PATENT DOCUMENTS

| | | | |
|---|---|---|---|
| 4,607,327 | 8/1986 | Kishi et al. | 364/191 |
| 5,121,477 | 6/1992 | Koopmans et al. | 395/333 |
| 5,251,159 | 10/1993 | Rowson | 395/356 |
| 5,261,042 | 11/1993 | Brandt | 395/333 |
| 5,295,062 | 3/1994 | Fukushima | 364/188 |
| 5,367,624 | 11/1994 | Cooper | 395/357 |
| 5,384,910 | 1/1995 | Torres | 395/333 |
| 5,420,975 | 5/1995 | Blades et al. | 395/353 |
| 5,420,978 | 5/1995 | Tozawa et al. | 364/188 |
| 5,465,215 | 11/1995 | Strickland et al. | 364/188 |
| 5,530,796 | 6/1996 | Wang et al. | 395/356 |
| 5,559,944 | 9/1996 | Ono | 395/353 |

FOREIGN PATENT DOCUMENTS 2207780 2/1989 United Kingdom.
88/06313 8/1988 WIPO.

*Primary Examiner*—Eric W. Stamber
*Attorney, Agent, or Firm*—Finnegan, Henderson, Farabow, Garrett & Dunner, L.L.P.

[57] ABSTRACT

A man-machine interface system for a process controller according to the present invention enables its direct picture select button function to be effectively used by each user, and is improved in the operability of picture selection for interrupt display. The system includes a display, a picture data controller for controlling the pictures, which are displayed on the display, and at least one direct picture select button for requesting the display of an interrupt picture on the display to set control requirements and monitor operating conditions with the controller. In response to the interrupt picture display request by the button, a specified picture is displayed as an interruption on the display. The system further includes an interrupt picture definition table for setting by the user to changeably define on a user's setting picture the picture for interrupt display. The interrupt picture set by the user can be displayed independently of the initialization hierarchy by only operating the button.

3 Claims, 5 Drawing Sheets

MAN-MACHINE INTERFACE SYSTEM FOR A PROCESS CONTROLLER

FIELD AND BACKGROUND OF THE INVENTION

The present invention relates to a man-machine interface system for a process controller, which controls and monitors the operation and processes of an injection molding machine or the like. In particular, the invention relates to such a man-machine interface system which can display a specified picture as an interruption on its display in response to an interrupt picture display request by means of a direct picture select button.

A conventional man-machine interface system of a process controller for an injection molding machine or the like includes a display, which may be a liquid crystal panel, a picture data controller for controlling the pictures which are displayed on the display, and direct picture select buttons for requesting the display of interrupt pictures on the display in order to set control requirements and/or monitor operating conditions with the controller. In response to an interrupt picture display request with one of the buttons, a specified picture is displayed as an interruption on the display.

This man-machine interface system generally has a plurality of direct picture buttons. Each of the direct picture buttons corresponds to a group defined by dividing items according to their types, such as a controlled object or an operated object. For example, the buttons, respectively correspond to groups of objects, such as clamping/extrusion, injection/measurement, production control, operation clamping, and maintenance. The conventional system further includes interrupt picture definition tables, which define the pictures for the interrupt display in response to the interrupt picture display request by the buttons, each within the range of each of the groups corresponding to the buttons. When one of the buttons is operated, the picture defined by the associated table is displayed as an interruption.

The items of the interrupt pictures grouped for the respective direct picture select buttons are hierarchically distributed. The conventional system further includes a subordinate picture select button, which can be operated to display a subordinate picture as an interruption in the condition for displaying an interrupt picture by means of a direct picture select button.

By only operating a direct picture select button of the conventional system, the most superordinate picture defined by the associated table is displayed. The interrupt picture definition tables, however, are only those set by the system maker, which cannot be changed by users. Therefore, some users cannot display interrupt pictures for frequently used items by only operating direct picture select buttons. In order to display these pictures, there is a need to operate direct picture select buttons and the subordinate picture select button. As a result, the functions of the direct picture select buttons may not be effectively used. In particular, if the hierarchy is deep, there is a need to operate the subordinate picture select button many times for the desired picture. This lowers the operability of picture selection for interrupt display.

SUMMARY OF THE INVENTION

In view of the above problem, it is the object of the present invention to provide a user-friendly man-machine interface system for a process controller, which makes the function of the direct picture select button to be used effectively by the user, and which is improved in the operability of picture selection for interrupt display.

A man-machine interface system for a process controller according to the first invention comprises a display screen, a picture data controller to control the pictures which are displayed on the display, and a direct picture select button on the display, for requesting to display an interrupt picture to set control requirements and/or to monitor operation conditions of said controller. An interrupt picture is a specified picture displayed on the display screen, which interrupts or suspends the current running software program and associated display in response to the request by the button to display the interruptive picture. The system further includes an interrupt picture definition table for being set by a user with user setting picture to changeably define the picture interruptory displayed on the display in response to the request by the button to display the interruptive picture.

A man-machine interface system for a process controller according to the second invention is the system of the first invention, and further comprises an picture definition table for standard setting, to unchangeably define the picture displayed on the display in response to the request by the direct picture select button to display the interruptive picture, an interrupt picture definition table for final displaying to define the picture displayed on the display in response to the request by the button to display the interruptive picture as the interrupt picture displayed at the previous time, and a direct picture display mode select button for selecting one of the three tables.

A man-machine interface system for a process controller according to the third invention is the system of the first or second invention, wherein a plurality of the direct picture select button are equipped; each of the direct picture select buttons corresponds to items divided into groups according to their types such as controlled object, operated object; and an interrupt picture definition table for being set by a user is defined to changeably define the interrupt picture displayed on said display in response to the request by said button to display the interruptive picture within the range of each of the groups corresponding to said direct picture select buttons.

In the system of the first invention, the user can changeably set the picture for the interrupt display on the display in response to the interrupt picture display request with the direct picture select button. This customizes the interrupt picture to be displayed as an interruption by only operating the button. It is therefore possible to display the picture for the item frequently used by the user, by only operating the button.

In the system of the second invention, the user can select the picture displayed by means of the direct picture select button, one of the picture set by the user as mentioned above, the standard picture set by the maker, which is equivalent to the conventional counterpart, and the picture displayed at the previous time.

In the system of the third invention, the interrupt picture for with respect to each of the direct picture select buttons is customized within the range of each of the groups of controlled objects, operated objects, etc.

The nature, principle and utility of the invention will become more apparent from the following detailed description when read in conjunction with the accompanying drawings.

BRIEF DESCRIPTION OF THE DRAWINGS

A preferred embodiment of the present invention is described below in detail with reference to the accompanying drawings, in which.

DETAILED DESCRIPTION OF THE INVENTION

Figure 1:
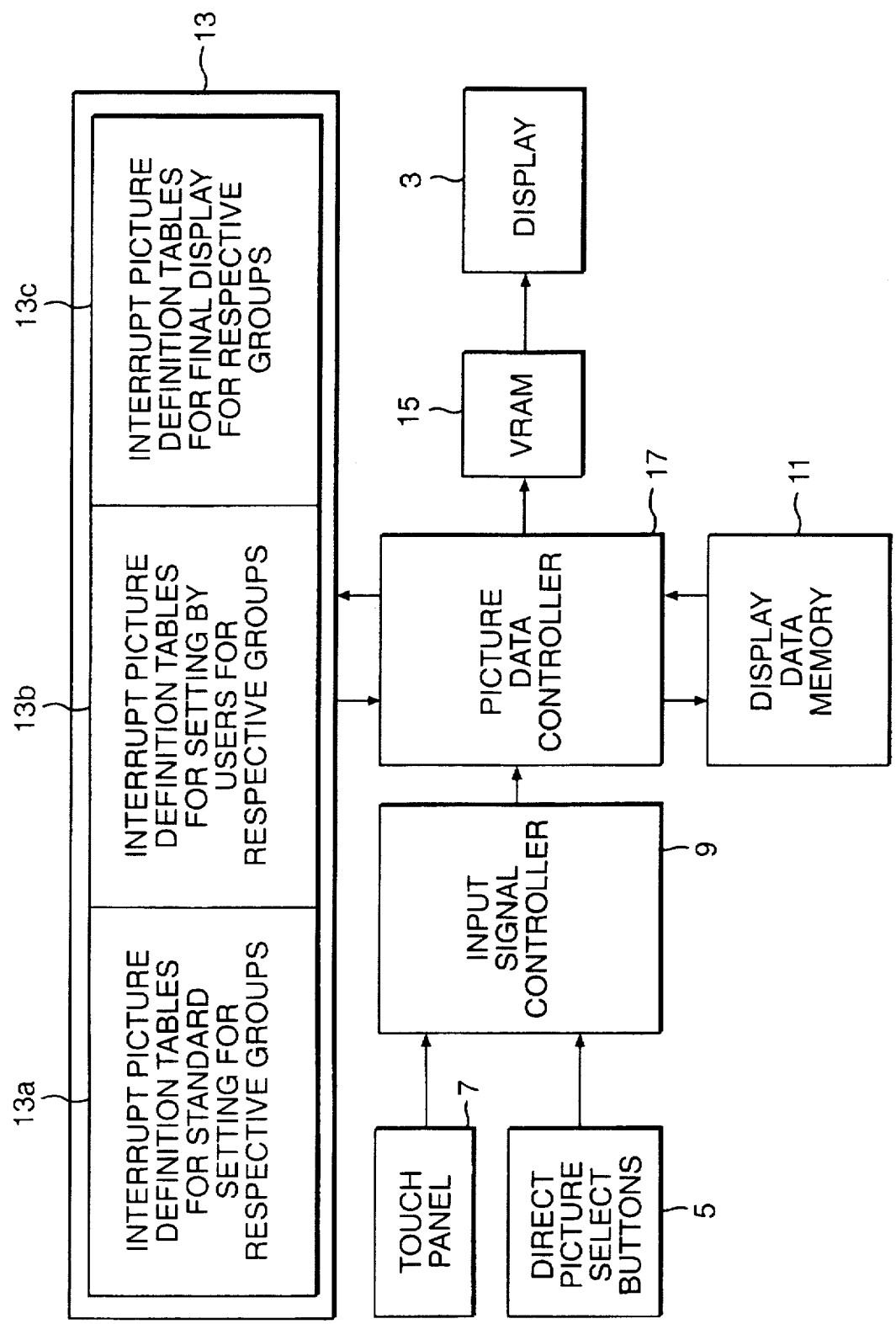
FIG. 1 is a block diagram of a man-machine interface system for a process controller according to the present invention.
Figure 2:
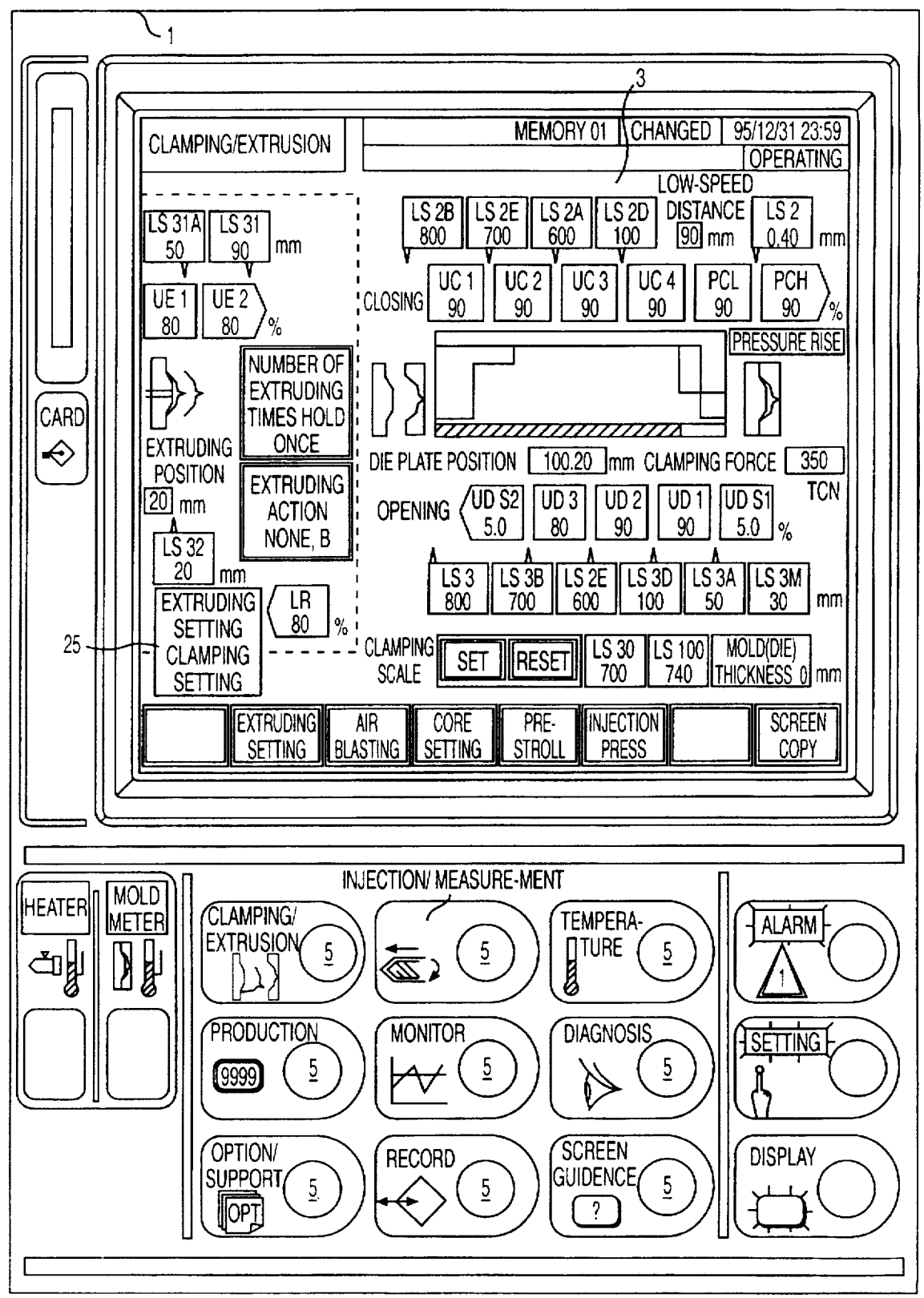
FIG. 2 is a front view of the system.

With reference to FIGS. 1 and 2, the man-machine interface system includes a body 1, a display screen 3, which may be a liquid crystal panel, in the front side of the body 1, and a number of direct picture select buttons 5, which are push buttons, below the display on the front side of the body 1. A transparent touch panel 7 (FIG. 1) is stuck to the display 3.

As shown in FIG. 1, the body 1 contains an input signal controller 9 for taking in the item selection signals and the interrupt picture display request signals from the touch panel 7 and the direct picture select buttons 5, a memory 11 for storing the data for display, tables 13 for defining the pictures (which may hereinafter be referred to as the pictures designated to be directly displayed) for interrupt display on the display 3 in response to the interrupt picture display request by the buttons 5, a VRAM 15 for storing the data which are displayed on the display 3, and a picture data controller 17 for reading the data from the memory 11 and transferring them to the VRAM 15 in response to the picture display request.

Each of the direct picture select buttons 5 corresponds to a group defined by dividing items according to their types such as controlled object, operated object. In the example shown in FIG. 2, the buttons 5 respectively correspond to eight groups of such objects, including clamping/extrusion, injection/measurement, temperature, production control, clamping, diagnosis (maintenance), option/support, and record (memory). When each button 5 is pushed, it outputs an interrupt picture display request to the input signal controller 9.

As exemplified in FIG. 2, the interrupt picture designated to be directly displayed defined in the tables 13, is displayed as an interruption on the display 3 by the interrupt picture display request by the direct picture select button 5.

In the table 13, each of the direct picture select buttons 5 respectively has a table 13a for defining the interrupt pictures for standard settings, a table 13b for defining the interrupt pictures for settings by users, and a table 13c for defining the interrupt pictures for final display. In other words, a table 13a, a table 13b and a table 13c for each group are provided.

The table 13a for standard settings are set by the system maker so that they cannot be changed.

Figure 4:
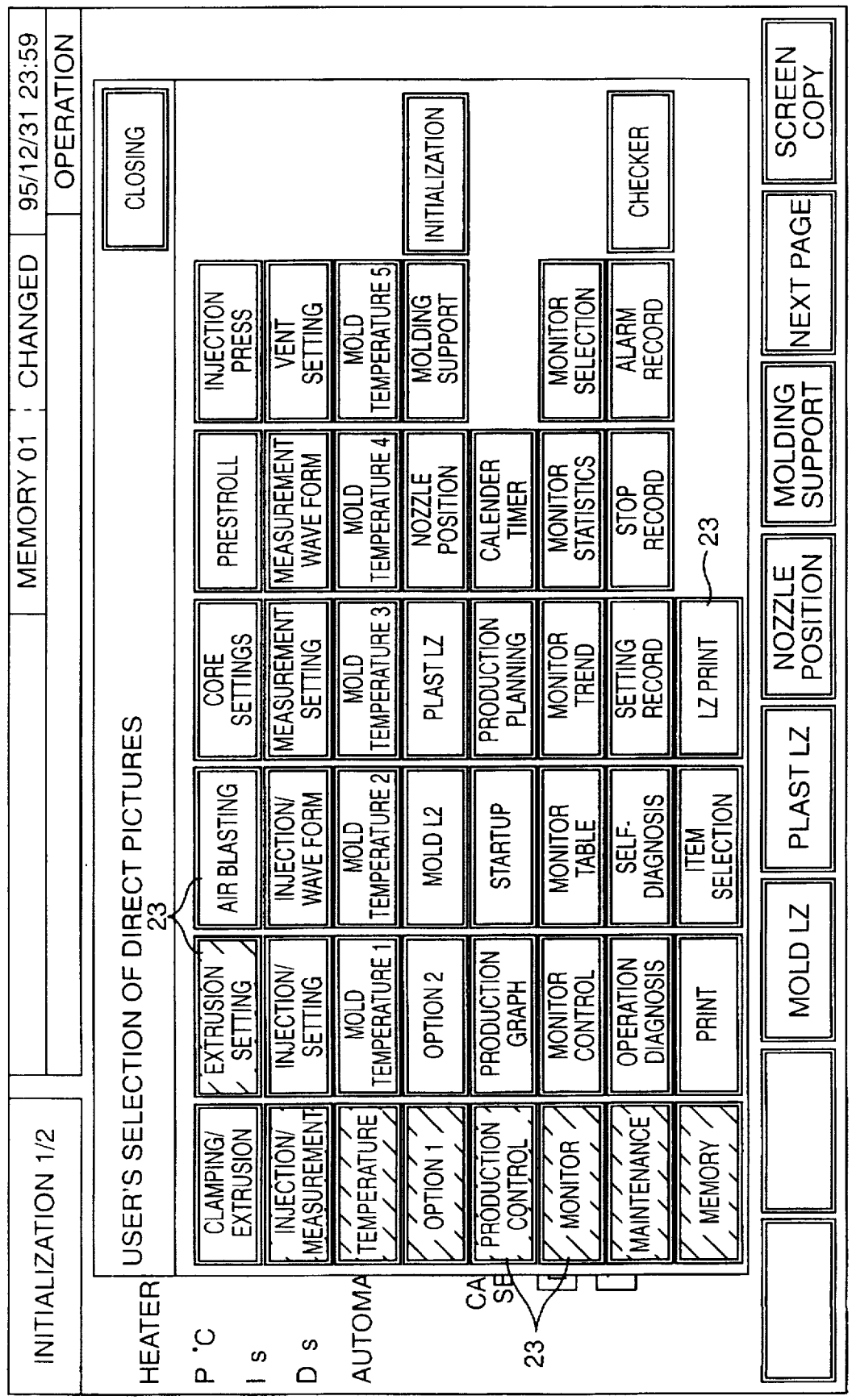
FIG. 4 shows the user's selectively setting picture of the direct pictures of the system.

Contrariwise, the table 13b for settings by users are set so that users can change the settings within the range of each group, which corresponds to each of the direct picture select buttons 5, by selectively inputting an item through the touch panel 7 on the picture for settings by users (FIG. 4).

Each of the tables 13c for final display sets the interrupt picture displayed previously for one of the direct picture select buttons 5, as the interrupt picture designated to be directly displayed by the next button 5.

The initial data of the tables 13b for settings by users and the tables 13c for final display may be the same as the data of the tables 13a for standard settings as default values.

Figure 3:
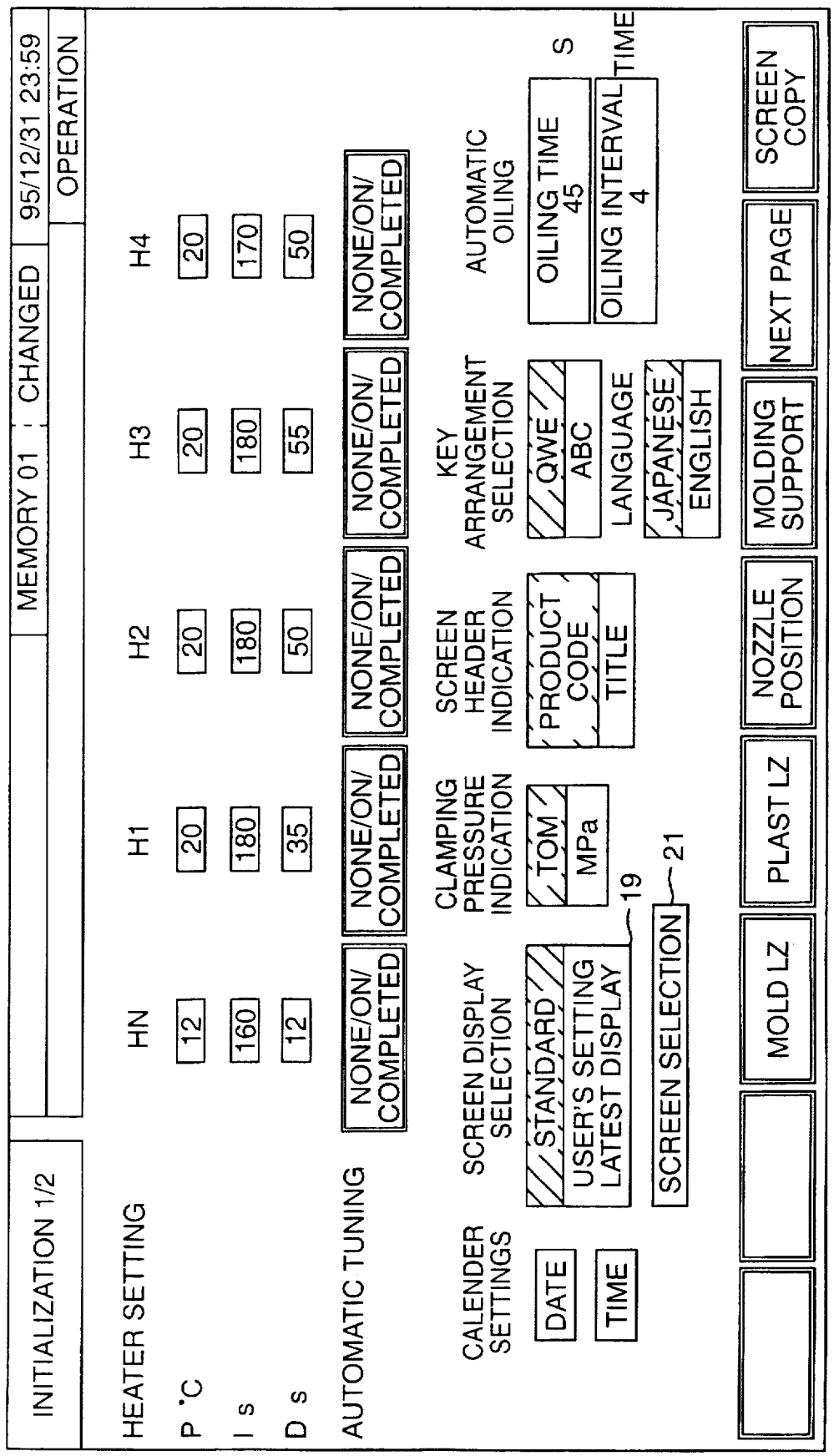
FIG. 3 shows the initialization picture of the system.

As shown in FIG. 3, the initialization picture contains a direct picture display mode select button 19, which can be touched through the touch panel 7 to select one of the tables 13a, 13b and 13c.

The initialization picture also contains a picture select button 21, which can be touched through the touch panel 7 to display the picture for settings by users (FIG. 4) in the setting mode with the tables 13b for defining the interrupt pictures for settings by users.

The picture for selected by user-settings (picture for selection of direct pictures by users) in FIG. 4 contains a list of interrupt display item buttons 23, which are grouped into lines each for each of the direct picture select buttons 5. The interrupt display item buttons 23 on each line of the list are displayed according to the display hierarchy (hierarchic sequence) specified by the maker. The first button 23 of each line is the interrupt display item designated to be directly displayed which is specified by the maker, that is to say, according to the standard settings. The user can touch the interrupt display item buttons 23 to change the settings on the interruptory displayed pictures (pictures designated to be directly displayed) selected by the direct picture select buttons 5. The interrupt display item buttons 23 for the interrupt pictures selected by the user are reversed in illumination.

When an interrupt picture is displayed by a direct picture select button 5, as shown in FIG. 2, a subordinate picture display button 25 appears in the picture. Each time this button 25 is touched, the interruptory displayed picture for the next subordinate item is displayed.

Figure 5:
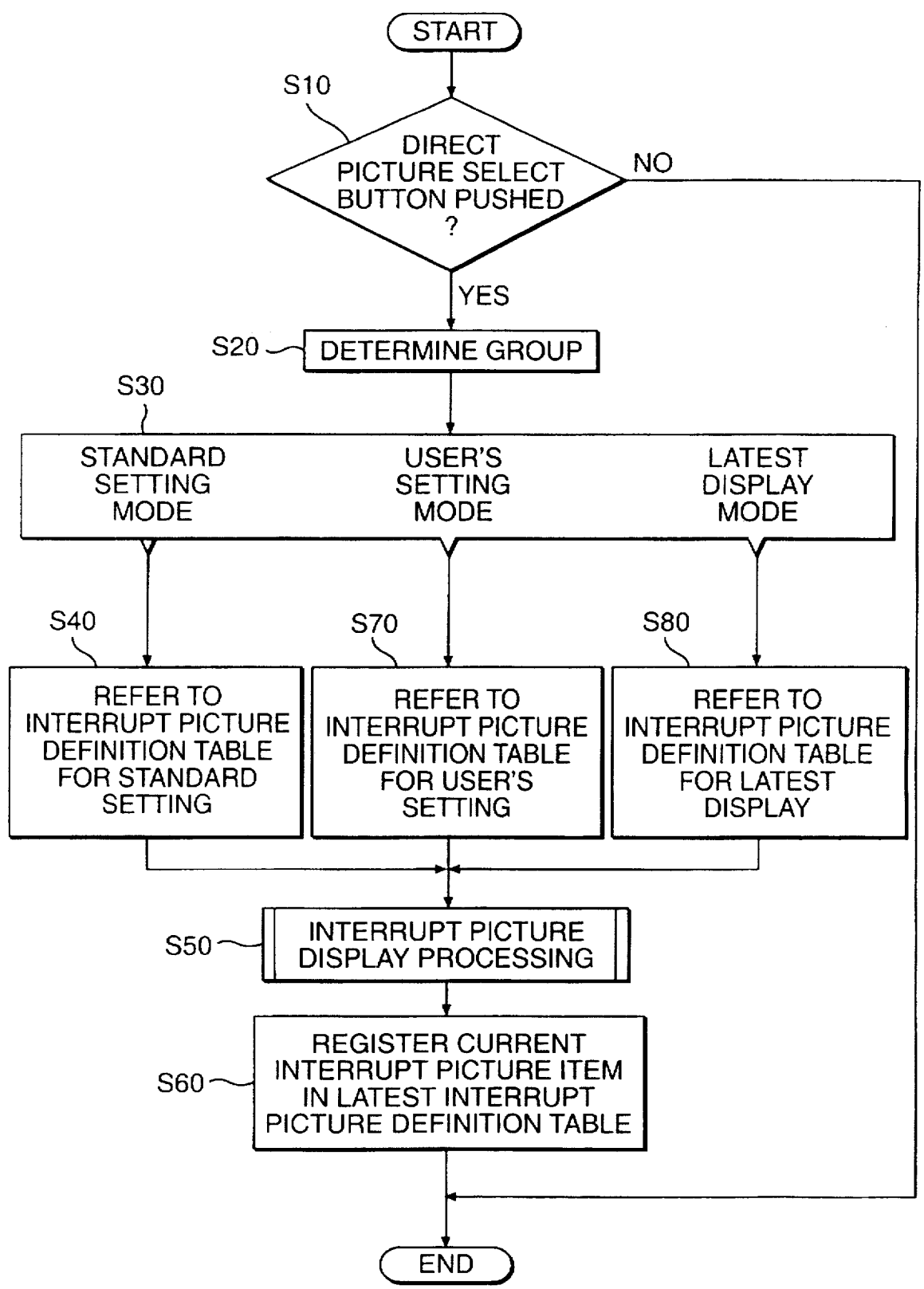
FIG. 5 is a flowchart of the interrupt picture display routine of the system.

With reference to the flowchart of FIG. 5, the interrupt picture display routine in this system is explained below. First, it is judged if any direct picture select button 5 has been pushed (step 10). If so, the interrupt picture display request signal is received, and the group of the pushed button 5 is determined (step 20).

Next, it is judged which of the direct picture display modes is selected by the direct picture display mode select button 19 (step 30). The modes include a standard setting mode, a user's setting mode, and a final display mode.

If the direct picture display mode is the standard setting mode, the table 13a for defining the interrupt picture for standard settings for the associated group is accessed (step 40). The data of the interrupt picture designated to be directly displayed which is defined by the table 13a are read from the memory 11, and transferred to the VRAM 15. Then, the interrupt picture designated to be directly displayed for the group corresponding to the pushed direct picture select button 5 is displayed on the display 3 (step 50).

If this picture is displayed, the item of the currently displayed interrupt picture designated to be directly displayed is written for registration in the table 13c for defining the interrupt picture for final display for the associated group (step 60).

If the direct picture display mode is the user's setting mode, the table 13b for defining the interrupt picture for settings by users for the associated group is accessed (step 70). The data of the interrupt picture designated to be directly displayed which is defined by the table 13b are read from the memory 11, and transferred to the VRAM 15. Then, the interrupt picture designated to be directly displayed for the group corresponding to the pushed direct picture select button 5 is displayed on the display 3 (step 50). Therefore, the interrupt picture designated by the user is immediately displayed by only pushing the button 5, independently of the initialization hierarchy.

In this case as well, if the picture is displayed, the item of the currently displayed interrupt picture designated to be directly displayed is written for registration in the table 13c for defining the interrupt picture for final display for the associated group (step 60).

If the direct picture display mode is the final or latest display mode, the table 13c for defining the interrupt picture for final display for the associated group is accessed (step 80). The data of the latest interrupt picture designated to be directly displayed is defined by the table 13c are read from the memory 11, and transferred to the VRAM 15. Then, the interrupt picture designated to be directly displayed for the group corresponds to the latest displayed interrupt picture of the pushed direct picture select button 5 and is, thus, is displayed on the display screen 3 (step 50). Therefore, the previously displayed interrupt picture for the same group is displayed again.

In this case as well, if the picture is displayed, the item of the currently displayed interrupt picture designated to be directly displayed is written for registration in the table 13c for defining the interrupt picture for final display for the associated group (step 60).

The present invention has been described above in detail in reference to the specific embodiment. It would, however, be apparent to one skilled in the art that the invention should not be limited to the embodiment, but may be embodied in various forms within the scope of the invention.

As will be understood from the above description, the system of the first invention enables the user to changeably set the picture for interrupt display in response to the interrupt picture display request with the direct picture select button. It is therefore possible to display as interruptions the pictures for the items frequently used by the user, by only operating the button, independently of the initialization hierarchy. This enables the function of the button to be more effectively used by the user. As a result, the operation of picture selection for interrupt display is very user-friendly.

The system of the second invention enables the user to select the picture displayed by means of the direct picture select button, one of the picture set by the user, (the standard picture set by the maker, which is equivalent to the conventional counterpart), and the prior picture displayed. The user can thus select one of the pictures set by the maker, set by the user and displayed at the last time, respectively, as the picture for interrupt display by means of the direct picture select button. It is therefore possible for each user to more effectively use the function of the direct picture select button in his/her manner.

In the system of the third invention, the picture for interrupt display with respect to each of the direct picture select buttons is customized within the range of each of the groups of controlled objects, operated objects, etc. It is therefore possible to display interrupt pictures set by the user with respect to the associated group direct picture select buttons, by only operating these buttons, independently of the initialization hierarchy. In addition, excessive changes to the user's settings for the interrupt picture by selecting each direct picture select button, beyond the associated group, is avoided.

It should be understood that many modifications and adaptations of the invention will become apparent to those skilled in the art and it is intended to encompass such obvious modifications and changes in the scope of the claims appended hereto.

What is claimed is:

1. A man-machine interface system for a process controller, comprising:

a display screen;

a picture data controller for controlling pictures displayed on said display screen;

a direct picture select button for requesting a display of an interrupt picture to set control requirements through said display screen and to monitor operative conditions of said process controller, whereby a specified picture is displayed on said display screen in response to the interrupt picture display request by said direct picture select button to display the interrupt picture;

a first interrupt picture definition table enabling user specified settings to changeably define the interrupt picture displayed on said display screen in response to the interrupt picture display request by said direct picture select button;

a second interrupt picture definition table for providing standard settings that unchangeably define the interrupt picture displayed on said display screen in response to the interrupt picture display request by said direct picture select button;

a third interrupt picture definition table for providing definition of a latest displayed interrupt picture as the interrupt picture displayed on said display screen in response to the interrupt picture display request by said direct picture select button to display the interrupt picture; and a direct picture display mode select button for selecting one of said first, second, and third interrupt picture definition tables.

2. A man-machine interface system of claim 1, further comprising:

a plurality of said direct picture select buttons, wherein each of said direct picture select buttons corresponds to each of item groups defined by dividing items into groups according to their types and said first interrupt picture definition table includes settings to enable the display of the interrupt picture within the range of each of the item groups corresponding to each of said direct picture select buttons.

3. A man-machine interface system of claim 1, further comprising:

a subordinate picture display button, displayed on said display screen with the interrupt picture, for displaying a subordinate interrupt picture.

* * * * *